J. KAHN.
STRUCTURAL JOINT.
APPLICATION FILED FEB. 6, 1915.

1,192,207.

Patented July 25, 1916.
2 SHEETS—SHEET 1.

Witnesses
E. R. Burrell
H. W. Kreinbring

Inventor
Julius Kahn
By Pagelsen and Spencer,
Attorney

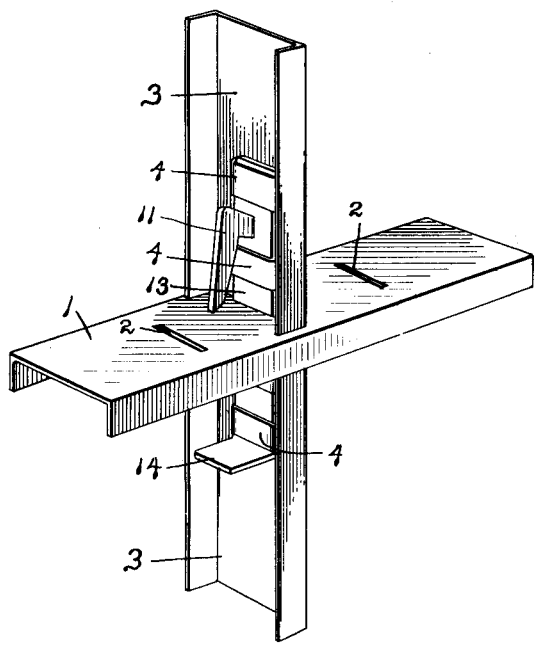
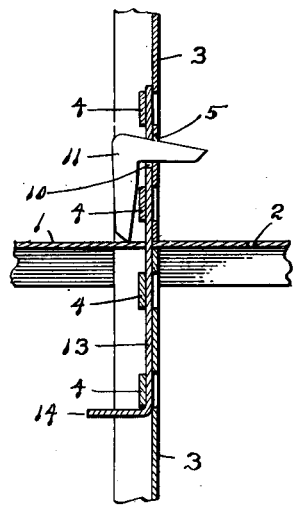
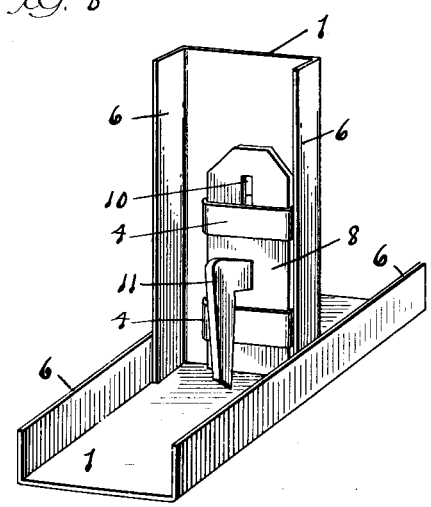
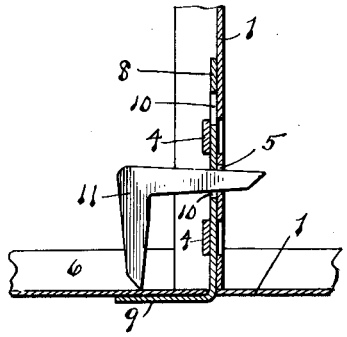

UNITED STATES PATENT OFFICE.

JULIUS KAHN, OF YOUNGSTOWN, OHIO.

STRUCTURAL JOINT.

1,192,207.  Specification of Letters Patent.  Patented July 25, 1916.

Application filed February 6, 1915. Serial No. 6,432.

*To all whom it may concern:*

Be it known that I, JULIUS KAHN, a citizen of the United States, and a resident of Youngstown, in the county of Mahoning and State of Ohio, have invented a new and Improved Structural Joint, of which the following is a specification.

This invention relates to means for connecting a plurality of structural members, preferably channels, and is employed in connection with at least two structural members, one formed with a transverse slot and the second with means for retaining a connector, in combination with a connector adapted to be mounted on one of these structural members and extend through the slot in the other, and a key to lock all the parts in position.

Figure 3:
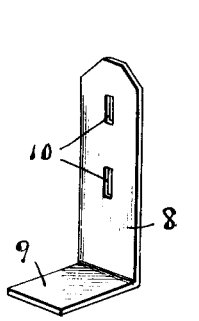
Figure 1:
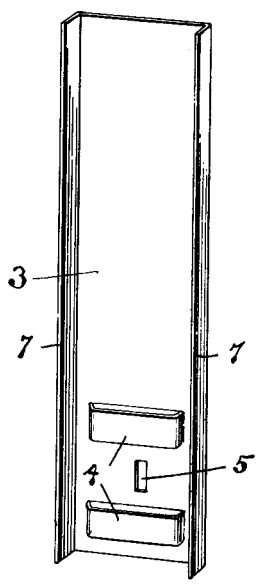
Figure 2:
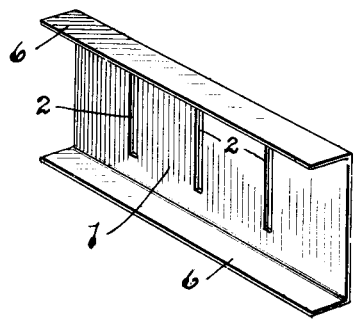
Figure 4:
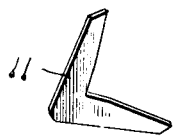
Figure 5:
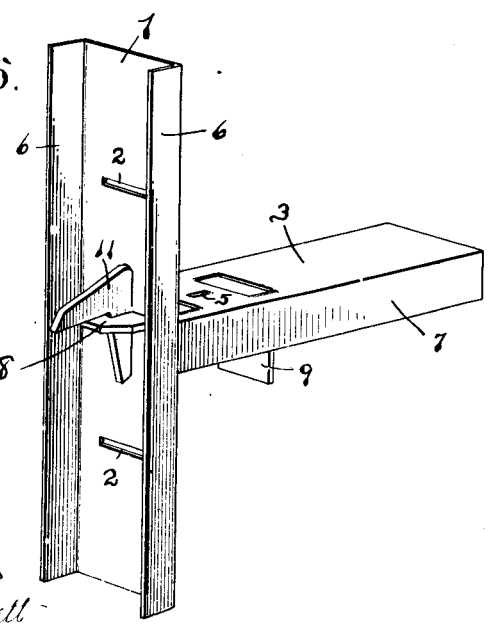
Figure 6:
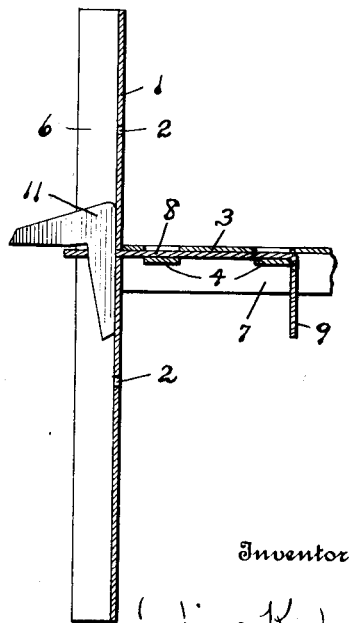

In the accompanying drawing, Figures 1 and 2 are perspective views of two of the structural members adapted to be joined by the connector shown in Fig. 3 and the key shown in Fig. 4. Fig. 5 is a perspective view of two members thus connected. Fig. 6 is a vertical central section thereof. Figs. 7 and 8 are two perspective views of two other embodiments of this invention. Figs. 9 and 10 are central vertical sections of the constructions shown in Figs. 7 and 8 respectively.

Similar reference characters refer to like parts throughout the several views.

While the drawings show the members to be connected as channels, the invention is not limited thereto, as any other structural members or forms, capable of being slotted and having stirrups or loops struck up from them may be employed. While one of the channels in each construction is shown of sufficient width between its flanges to receive the end of an adjacent channel, it is obvious that this is not necessary, for the upper member in Fig. 7 is shown resting against the outer side of the transverse channel. In these constructions, one of the members 1 is formed with any desired number of slots 2 through its web, spaced as may be desired. The other member 3 has its web formed with flat loops or stirrups 4 and a short longitudinal slot 5. The flanges 6 of the member 1 are preferably spaced to snugly fit the outer sides of the flanges 7 of the member 3. The connector 8 is formed of a flat plate and has an end 9 turned at an angle to its main portion and slots 10 properly spaced, as hereinafter described.

The key 11 is preferably formed with two arms, one usually narrower than the other.

When it is desired to unite two members 1 and 3 in such a manner that the member 3 extends at right angles from any desired slot 2 in the member 1, as shown in Figs. 5 and 6, the connector 8 may be slipped through the loops 4, projecting beyond the end of the member 3, and then inserted through a slot 2 in the member 1. The key 11 is then inserted in the outer slot 10 and driven down, drawing the member 3 against the member 1 and securely locking it in position. Or the connector may be inserted through a slot 2 in the member 1, as shown in Figs. 8 and 10, and through the stirrups 4 of the member 3, the bent end 9 lying flat against the web of the member 1, after which the key is inserted through the slot 5 in the member 3 and the outer slot 10 in the connector and driven in. In the latter case, the member 3 fits between the flanges 6 of the member 1. Ease in removing the key will determine whether the free arm of the key 11 projects up or down.

It is evident that the slot 10 in the upright bar in Figs. 8 and 10 may be so positioned, that when the key 11 is driven home, the sharp end of the downwardly extending arm of this key will engage or bite into the web 1 of the other bar. This prevents the key 11 from working loose and also serves to give the upright bar a broad footing which extends from the web 1 of this upright bar to the point of the downturned arm. This resists the tendency of the upright bar to sway to the left, in Fig. 10, swaying to the right being resisted by the end 9 of the connector.

In Figs. 7 and 9, three members are shown united. The channels 1 and 3 may be substantially similar and provided with stirrups and slots of the same character as those previously described. The body of the connector 13 is preferably sufficiently long to extend through beneath the stirrups 4 of both members 3 and through the slot 2 of the member 1, the end 14 being in contact with one of the stirrups. The key 11, when driven through the slot 15 in the connector and the slot 5 in the upper member 3, will draw up the lower member 3 and draw down the upper member against the transverse member 1. It will be observed from the sections that all these "key" slots are so located that the keys will cause a movement in opposite directions between these members 3 and the connectors, thus forcing the members 3 against the members 1.

The details of all these constructions can be modified as to proportions and details by those skilled in the art without departing from the spirit of my invention. This structural joint is of especial advantage in putting up temporary scaffolds and other structures of similar nature.

I claim:—

1. In a metal structure, the combination of a plurality of slotted flat-sided bars engaging at an angle, a connector lying against a flat side of one of the bars and extending through a slot in another and having the extending end bent over to prevent movement out of said slot, and a two-armed key having one arm extending through slots in the first bar and in the connector to force the bars together, the other arm extending into engagement with said second mentioned bar.

2. In a metal structure, the combination of a pair of channel bars, one of said bars having a transverse slot through its web and the other having a stirrup struck up from its web transversely to its flanges, a connector extending beneath said stirrup and through said slot, and means engaging the connector and one of said channels to force it against the other channel.

3. In a metal structure, the combination of a plurality of slotted flat-sided bars engaging at an angle, a connector extending through a slot in one of the bars and lying flat against the second, said second bar having a stirrup struck therefrom by which the connector is held in position, said connector passing through between the stirrup and the rest of the bar, means on the connector for limiting its movement in one direction relative to one of the bars, and a tapering key extending through slots in said connector and second bar to draw the two bars together.

4. In a metal structure, the combination of a plurality of slotted bars engaging at an angle, a connector extending through a slot in one of the bars, a plurality of alined stirrups struck from the other bar whereby the connector is held in sliding engagement with a side thereof, one end of the connector being formed to prevent its movement relative to the first bar, and a tapering key extending through slots in the connector and in the second bar to draw the bars together.

5. In a metal structure, the combination of a plurality of slotted bars engaging at an angle, a connector extending through a slot in one of the bars and being held in sliding engagement with the side of the other bar, one end of the connector being formed to prevent its movement relative to the first bar, and a two-armed key having a tapering arm extending through slots in the connector and the second bar to draw the bars together and having a second arm extending into engagement with the first bar at a distance from the point of engagement of said bars.

6. The combination of a pair of structural members engaging at an angle, one having a transverse slot and the second having a struck up stirrup, a connector extending beneath the stirrup and through said slot, said connector including means whereby its movement through the slot in one direction is limited, and a two-armed key having a wedge-shaped arm engaging the connector and one structural member to force it against the second and having another arm provided with a pointed end adapted to engage the second member a distance from said slot.

7. In a metal structure, the combination of a pair of bars arranged on intersecting lines, one of the bars having a stirrup struck therefrom and being perforated, the other bar also being perforated, and a connector passing through between the stirrup and the rest of the first mentioned bar and through the perforation in the second bar, said connector having an opening therethrough, and a wedge passing through the opening in the connector and through the perforation in the first mentioned bar, whereby the bars are forced together.

8. In a metal structure, the combination of a pair of bars, arranged on intersecting lines, one of the bars having a stirrup struck therefrom and being perforated, the other bar also being perforated, and a connector passing through between the stirrup and the rest of the first mentioned bar and through the perforation in the second bar, said connector having an opening therethrough, and a two-armed wedge-member, one arm of which passes through the opening in the connector and through the perforation in the first mentioned bar, its other arm being arranged to exert pressure on the second mentioned bar at a point some distance from the perforation therein, whereby the bars are forced together and braced from swaying in respect to each other.

9. In a metal structure, the combination of three bars, two of which are arranged on a line that crosses the others, the last mentioned bar and one of the first mentioned bars being perforated, each of the first mentioned bars having a stirrup struck therefrom, a connector passing through between the stirrups and the rest of the two first mentioned bars and through the perforation in the other bar, and wedge means passing through the connector and through the hole in the perforated bar of the two first mentioned bars whereby the three bars are rigidly secured together.

10. In combination three members, one interposed between the other two and extend ing at an angle therefrom and being slotted transversely, one of the other two members having a stirrup struck therefrom near its end, a connector passing through between the stirrup and the rest of the member and also passing through the slot in the interposed member, and projecting beyond the latter, and a wedge engaging the projecting portion of the connector and the second of the two members between which the other member is interposed, said wedge serving to force the several members tightly together.

11. In a metal structure, the combination of three flat-sided bars, two of which are alined with each other on a line that crosses the third, the third bar and one of the two first mentioned bars being perforated, each of the two first mentioned bars including a stirrup struck from the flat side of the bar, a perforated connector passing through between the stirrups and the corresponding flat sides of the two first mentioned bars and through the perforation in the third bar, and a two-armed wedge passing through the perforations in the connector and in the perforated one of the two first mentioned bars, said wedge engaging the third bar at a point removed somewhat from the perforation therein, whereby the bars are held together and prevented from swaying.

12. In a metal structure, the combination of two bars arranged on intersecting lines, the first having a flat slotted side and the second having a flat side and parallel flanges formed along the edges thereof, said flanges projecting in the same direction from the flat side, the second bar also having a stirrup struck therefrom and being perforated, a perforated connector passing through the slot in the first bar and between the stirrup and the rest of the flat side of the second bar, and a two-armed wedge, one arm of which passes through the perforation in the connector and the perforation in the second bar, the other arm engaging the flat side of the first bar at a point removed some distance from the slot therein, and on the same side of the slot as the flanges on the second bar extend, whereby the bars are held together and braced against swaying.

13. In a metal structure, the combination of a plurality of bars, one of which has a pair of spaced alined stirrups struck therefrom, said bar also being perforated between the stirrups, the other bar being slotted, a connector passing through between the alined stirrups and the rest of the first mentioned bar, said connector also passing through the slot in the second mentioned bar and being perforated at a plurality of points, and a wedge, the arrangement being such that, when the connector is passed through the stirrups in one direction, the wedge may be inserted through one of the perforations in the connector to force the bars together, and when the connector is passed through the stirrups in the other direction, the wedge may be passed through another of the perforations in the connector and through the perforation between the stirrups to force the bars together, whereby an interchangeable connection is formed.

In testimony whereof I sign this specification in the presence of two subscribing witnesses.

JULIUS KAHN.

Witnesses:
W. MERLE SMITH,
CHAS. W. BARKER.